UNITED STATES PATENT OFFICE.

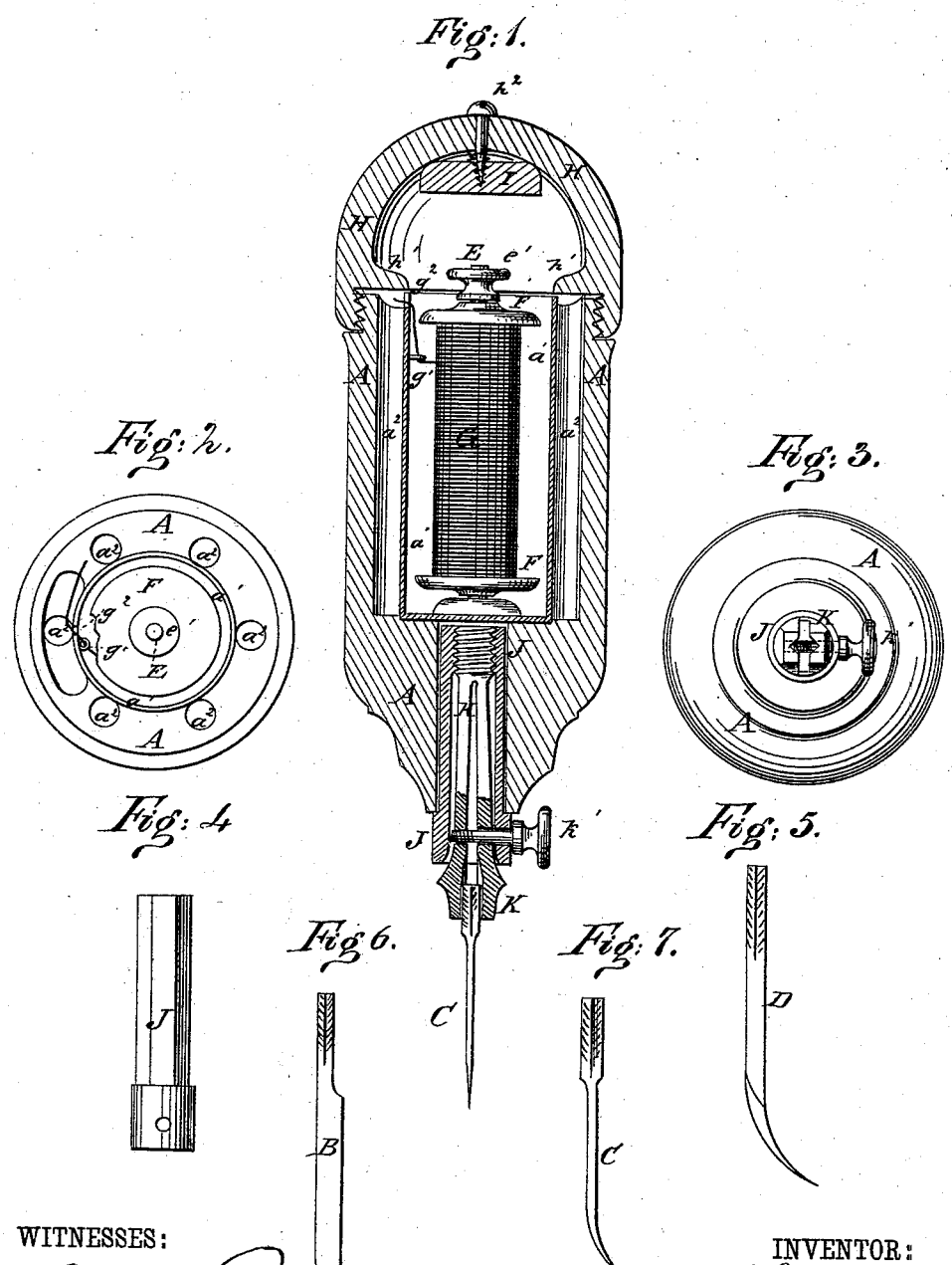

CHARLES P. ADAMS, OF STOCKBRIDGE, MASSACHUSETTS.

IMPROVEMENT IN INSTRUMENTS FOR MENDING HARNESS AND OTHER ARTICLES.

Specification forming part of Letters Patent No. 221,991, dated November 25, 1879; application filed September 13, 1879.

*To all whom it may concern:*

Be it known that I, CHARLES P. ADAMS, of Stockbridge, in the county of Berkshire and State of Massachusetts, have invented a new and Improved Machine for Mending Harness and other Articles, of which the following is a specification.

Figure 1 is a longitudinal sectional elevation of my improvement. Fig. 2 is a plan view, the cap being removed. Fig. 3 is an end view of the improvement. Fig. 4 is a detail view of the socket. Figs. 5, 6, and 7 are detail views of some of the tools.

Similar letters of reference indicate corresponding parts.

The object of this invention is to furnish an improved instrument for use in connection with the mending of harnesses and other purposes.

The invention consists in a cap provided with a shoulder to cover cavities, in combining a spool and spindle with a handle, and in combining a socket and tool-holder with handle, as hereinafter described.

A represents the handle, which is made of such a shape and size as to serve also as a receptacle for various tools. The handle A is made with a large central cavity, $a'$, which may be lined with metal, and which is surrounded with a number of smaller cavities, $a^2$, of suitable shape and size to serve as receptacles for a knife-blade, B, a needle, C, a hook, D, for removing stones from horses' feet, and other suitable tools.

To the handle A, at the bottom of its central cavity, $a'$, is attached a spindle, E, upon which is placed a spool, F, to receive waxed thread G. The spool F is secured in place upon the spindle E by a hand-nut, $e'$, screwed upon the end of the said spindle. The end of the waxed thread G is passed through an eye, $g'$, attached to the wall of the cavity $a'$, and is slipped into a slot, $g^2$, formed in the upper edge of the said wall, so that the end of the thread G may be at all times conveniently accessible.

The handle A is provided with a screw-cap, H, which is made with a shoulder, $h'$, to cover the upper ends of the cavities $a^2$, as shown in Fig. 1. In the apex of the cavity of the cap H is secured, by the screw-holder $h^2$, a cake, I, of wax for waxing the ends of the needles or the thread, as may be required.

J is a socket, which is made polygonal in form, and is driven into a hole in the lower end of the handle A. In the inner surface of the inner end of the socket J is formed a screw-thread to receive a screw-thread cut upon the shank of the tool-holder K, the jaws of which are drawn together to clamp the shank of a tool by a hand-screw, $k'$, passing in through the side of the socket J through one of the jaws of the tool-holder, and screwing into the other jaw, as shown in Fig. 1.

Having thus described my invention, I claim as new and desire to secure by Letters Patent—

1. In a tool-holder, the cap H, provided with the shoulder $h'$, adapted to cover the cavities $a^2$, substantially as shown and described.

2. The combination of the spool F, and the spindle E, with the handle A, arranged substantially as herein shown and described.

CHARLES P. ADAMS.

Witnesses:
JAMES T. GRAHAM,
C. SEDGWICK.